(12) United States Patent
Tomono (10) Patent No.: US 6,396,463 B1
(45) Date of Patent: May 28, 2002

(54) IMAGE PROJECTION APPARATUS (75) Inventor: Takao Tomono, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/321,757

(22) Filed: May 28, 1999

(30) Foreign Application Priority Data

Jul. 23, 1998 (JP) .......................................... 10-223575

(51) Int. Cl.$^7$ ................................................ G09G 5/00
(52) U.S. Cl. ...................... 345/8; 345/7; 345/9; 345/32; 359/13; 359/15; 359/19; 359/20; 359/22; 359/27; 348/51; 348/53; 348/115
(58) Field of Search ...................... 345/7–9, 32; 359/13, 359/15, 16, 19, 22, 29, 559, 20, 471, 619, 620, 622, 630, 631; 348/51, 53, 115

(56) References Cited

U.S. PATENT DOCUMENTS

| | | | |
|---|---|---|---|
| 4,309,070 A | * 1/1982 | St Leger Searle | |
| 5,371,556 A | * 12/1994 | Suwa et al. | 351/158 |
| 5,499,138 A | * 3/1996 | Iba | |
| 5,644,323 A | * 7/1997 | Hildebrand et al. | 345/8 |
| 5,701,132 A | * 12/1997 | Kollin et al. | 345/7 |
| 5,742,262 A | * 4/1998 | Tabata et al. | 345/8 |
| 5,838,498 A | * 11/1998 | Hildebrand et al. | 359/630 |
| 6,157,352 A | * 12/2000 | Kollin et al. | 345/7 |

FOREIGN PATENT DOCUMENTS

| | | |
|---|---|---|
| JP | A-2-136818 | 5/1990 |
| JP | A-4-23579 | 2/1992 |
| JP | A-5-328261 | 12/1993 |

* cited by examiner

*Primary Examiner*—Richard Hjerpe
*Assistant Examiner*—Henry N. Tran
(74) *Attorney, Agent, or Firm*—Oliff & Berridge, PLC (57) ABSTRACT

There is provided an image projection apparatus which is small and in which a picture image can be stably observed while high resolution is maintained. The image projection apparatus is structured such that a beam of light from a light source passes through a condensing lens to be converged, and is brought into focus at a space filter. This focus is a secondary point light source, and a diverging spherical wave from this is converted into a parallel beam of light by an illuminating hologram optical element. This parallel beam of light illuminates a transmission space modulator (color liquid crystal display element), is converted into a converged beam of light by an object hologram optical element, and is brought into focus at a pupil. This point is a secondary light source image. This image becomes a Fourier transform image (diffraction image surface) of picture image information of the space modulator, and after passing through an eyeball lens, it forms a geometric image on a retina.

26 Claims, 5 Drawing Sheets

IMAGE PROJECTION APPARATUS

BACKGROUND OF THE INVENTION

1. Field of the Invention

The present invention relates to an image projection apparatus for projecting a high-definition picture image in a wide angle of view onto a retina.

2. Description of the Related Art

Hitherto, this kind of apparatus has been designed so as to become small and thin so that it can be used while being mounted on a human head. As an example, Japanese Patent Unexamined Publication No. Hei. 2-136818 discloses an image display apparatus. This apparatus is such that a picture image displayed on a display element is made to bypass an optical system of an eye of an observer, so that it is directly projected on a retina. Thus, in this apparatus, it is possible to observe an image in an angle of view corresponding to a converging angle of a lens. According to this method, it is not necessary to add a function such as diopter adjustment to the optical system. This apparatus is specifically constituted by a point light source such as a midget lamp, a picture image panel irradiated by this point light source, and a short focus convex lens integrated with this picture image panel. In this apparatus, an image on the picture image panel illuminated with light from the point light source is brought into focus at a pupil positioned in an eyeball lens. This focus is a light source image and becomes a diffraction image plane of the picture image displayed on the display element. This point is made a pinhole, and the picture image on the display element is directly projected on the retina. In this apparatus, although it is possible to observe an image in an angle of view corresponding to a converging angle, large aberration occurs in the case where only one short focus lens is used, so that it is impossible to observe a high-definition picture image.

An image display apparatus improving this point is disclosed in, for example, Japanese Patent Unexamined Publication No. Hei. 4-23579 (or U.S. Pat. No. 5,371,556). This apparatus is constituted by an illuminating lens for illuminating a picture image panel, and an objective lens for projecting a picture image of a display element onto a retina. Specifically, after an angle of divergence of a beam of light from a midget lamp (point light source) is once controlled by a lens, the direction of the beam of light is changed by two mirrors, and then, the beam is made a parallel beam by a convex lens to illuminate an LCD panel. The direction of the beam of light is controlled by a convex lens disposed immediately after the LCD panel and the picture image beam of light is condensed by a short focus convex lens. An image of the point light source is formed on the pupil of an observer, so that the picture image of the display element is projected on the retina of the observer.

Japanese Patent Unexamined Publication No. Hei. 5-328261 (or U.S. Pat. No. 5,499,138) discloses another improved image display apparatus. In this apparatus, a two-dimensional microlens array is disposed on a display element, and an image of a pixel formed there is formed on a retina. Specifically, the two-dimensional microlens array is disposed on a transmission liquid crystal display element illuminated by a two-dimensional LED array or surface light source, and an outgoing beam of light from each pixel of the display element is converted into a parallel beam of light by a condenser lens and is led into an eyeball. In this apparatus, since an image corresponding to each pixel is formed on the retina by the lens action of the eyeball, a clear image can be obtained.

On the other hand, U.S. Pat. No. 4,309,070 discloses a display apparatus using a large-off axis hologram optical element to miniaturize a display apparatus of a beam combiner. In this apparatus, a beam of light of a picture image displayed on a screen of a CRT is converted into a collimated beam of light through a lens, is incident from an end surface of a transparent substrate, is reflected in the substrate, and is diffracted by the hologram. Although an observer observes a virtual image, the observer can observe the outside at the same time through the transparent substrate and the hologram.

Among the related art, in the apparatus using the illuminating lens and the objective lens, as compared with an apparatus including only one short focus lens, an image with high resolution can be obtained. However, there has been a problem that the resolution is influenced by the size of the light source. Besides, in the apparatus using the illuminating lens and the objective lens, although it is possible to observe an image in a wide angle of view, at least two lenses are required and the optical system becomes complicated. Actually, for the purpose of correcting (color) aberration and spherical aberration, a combination lens of at least four lenses is required. Basically, the lens is used in a coaxial optical system. In order to prevent the size of the apparatus from increasing, contrivance of use with folding at a mirror is adopted. However, the number of optical parts becomes eight, and it has been difficult to miniaturize the apparatus any more.

In the apparatus using the two-dimensional microlens array, as compared with an apparatus of using only one short focus lens, an image corresponding to each pixel is obtained, so that clear display can be obtained. However, an optimum pixel size and a pixel pitch obtained from calculation are 6.5 $\mu$m square and 185×184 $\mu$m. That is, although the pixel size is small, the pixel pitch is large. For the purpose of obtaining high resolution, a display element of a large screen becomes necessary, and the increase of the size of the apparatus can not be avoided. Even if a large angle of view is obtained, since parallel beams of light are led into the eye and the optical system of the eye is used, the merit that the optical system of the eye can be bypassed is lost differently from the structure of the apparatus using only one short focus lens.

In the apparatus using one short focus lens or the illuminating lens and the objective lens, when the movement (direction of line of sight) of the eye of the observer and the mounting position of the apparatus are changed, distortion occurs in the image formed on the retina. The reason is that although the picture image panel and the retina are in conjugate relation through the large pinhole of the pupil, when the position of the line of sight and the apparatus is shifted, the lens function of the eyeball contributes. In order to solve this problem, such contrivance has been made that a focal position is controlled by a mechanical deviation so that the focal position at the rear side of the short focus convex lens comes to the center of the eyeball lens. However, the increase in the size of the apparatus itself can not be avoided also in this case.

On the other hand, the apparatus using the large-off axis hologram has been proposed for miniaturizing a beam combiner display apparatus. However, when a virtual image of the CRT image is observed, the position of the virtual image and the size thereof are limited. Particularly, since the light path difference between the display and the large-off axis hologram optical element is greatly changed according to the position by the large-off axis, aberration becomes apt to occur. Like this, although this apparatus can be made compact, there are problems that an angle of view is narrow and the resolution becomes low.

From the above, the problem of an image projection apparatus is to realize such an apparatus that 1) the apparatus is miniaturized (including a decrease in the number of parts) while maintaining high resolution and a wide angle of view, 2) the outside can be perceived at the same time, and 3) distortion does not occur on the retina image by a small shift at the time of mounting, and so on.

SUMMARY OF THE INVENTION

An object of the present invention is therefore to provide an image projection apparatus which is small and in which a picture image can be stably observed while high resolution is maintained. Another object of the present invention is to provide an image projection apparatus having a see-through property in addition to the foregoing object.

The foregoing objects are achieved by an image projection apparatus which comprises a light source, a space filter receiving a beam of light from the light source to function as a secondary light source, and a space modulator illuminated with the beam of light from the secondary light source, and in which an image of the secondary light source is formed on a pupil and a picture image of the space modulator is projected on a retina.

Here, an illuminating optical system may be provided between the space filter and the space modulator.

The illuminating optical system is constituted by a hologram optical element or a diffraction optical element. Besides, an object optical system may be provided at an outgoing beam side of the space modulator. The object optical system is also constituted by a hologram optical element. The hologram optical element is of a large-off axis type, and is made of a transparent material to secure a see-through property.

The hologram optical element can be manufactured so as to correct color aberration and spherical aberration. Thus, one hologram optical element can be substituted for two lenses, so that the number of optical parts can be reduced. The hologram optical element has such uses as a diffraction grating, a lens, a beam combiner, a beam splitter, a filter, and a scanner according to a forming method of interference fringes. When the hologram optical element is used as the beam combiner, it is possible to see both the bright outside and the image display in overlapping. Since the function of the beam combiner can be added to the hologram optical element, the number of optical parts can be reduced.

In order to transmit an illuminating beam of light, a space modulation beam of light, and the like with high resolution by using the hologram optical element, as a result of optical simulation, it has been found that a coherent illuminating system is suitable. In order to obtain an illuminating beam of light having high coherence, it is appropriate that a spherical wave from a secondary light source is used. Here, the secondary light source is a light source image formed with a beam of light from some light source through, for example, a condensing optical system. Since this secondary light source is minute, it will be also hereinafter referred to as a secondary point light source or minute secondary point light source. This kind of optical system is similar to an optical system used in an object optical system of a microscope.

When the minute secondary point light source is used, an image formed on the pupil becomes a secondary point light source image. As a result, since the large pinhole of the pupil is not used but the light source image itself is minute, the depth of focus becomes deep. Thus, even if a small shift occurs at the time of mounting, the retina image is not distorted, but can be stably produced. The secondary light source is formed by the space filter. The space filter has an opening with a diameter of 2 mm or less, preferably 25 $\mu$m or less. Since a human pupil is about 2 $\mu$mm at a bright place, the opening of the space filter is made smaller than this.

An image projection apparatus of the present invention can be structured into a head mount type or an eyeglasses type, and includes an optical source disposed at a side of a frame of eyeglasses, a space filter receiving light from the light source to function as a secondary light source, a space modulator illuminated with light from the secondary light source, a transparent substrate attached to the frame of the eyeglasses, and a hologram optical element disposed on the transparent substrate to be adjusted such that an image of the secondary light source is formed on a pupil and a picture image of the space modulator is projected on a retina. Here, the transparent substrate may be made to have a flat surface shape or curved surface shape. The hologram optical element is formed by using any one of silver salt film, dichromated gelatin, and photopolymer. It is preferable that this hologram optical element is covered with a protective film.

Moreover, an image projection apparatus of the present invention includes a light source, and a space modulator illuminated with a beam of light from the light source, and is structured such that the diameter of a zeroth-order diffraction beam of light and a first-order diffraction beam of a diffraction image surface formed on a pupil by the beam of light from the space modulator is made 2 mm or less, and a picture image of the space modulator is projected on a retina. Here, as the light source, a secondary light source formed by the space filter can be used. The space filter is formed of at least one of an aperture stop and a field stop or a pinhole.

Moreover, an image projection apparatus of the present invention includes a light source in which the diameter of an outgoing beam of light is 2 mm less, and a space modulator illuminated with the beam of light from the light source, and is structured such that an image of the light source is formed on a pupil and a picture image of the space modulator is projected on a retina. Alternatively, an image projection apparatus comprises a light source, a space filter having an opening with a diameter smaller than the diameter of an incident beam of light from the light source, and a space modulator illuminated with the beam of light having passed through the space filter, and is structured such that a condensed point of light from the space modulator is positioned on a pupil, so that a picture image of the space modulator is projected on a retina.

According to an image projecting method of the present invention, a beam of light from a light source is made to pass through a minute opening, a space modulator is illuminated by using the minute opening as a secondary light source, an image of the secondary light source is made to be formed on a pupil, and a picture image of the space modulator is formed on a retina. A hologram optical element is used to form the image of the secondary light source.

By the structure as described above, according to the present invention, it is possible to obtain an image projection apparatus which is small and in which a picture image is stably observed while high resolution is maintained. At the same time, a see-through property can be secured.

BRIEF DESCRIPTION OF THE DRAWINGS

FIGS. 5A and 5B are views showing a structure of a reflection type LCD, in which

DESCRIPTION OF THE PREFERRED EMBODIMENTS

Preferred embodiments of the present invention will now be described with reference to the drawings.

(Embodiment 1)

Figure 1:
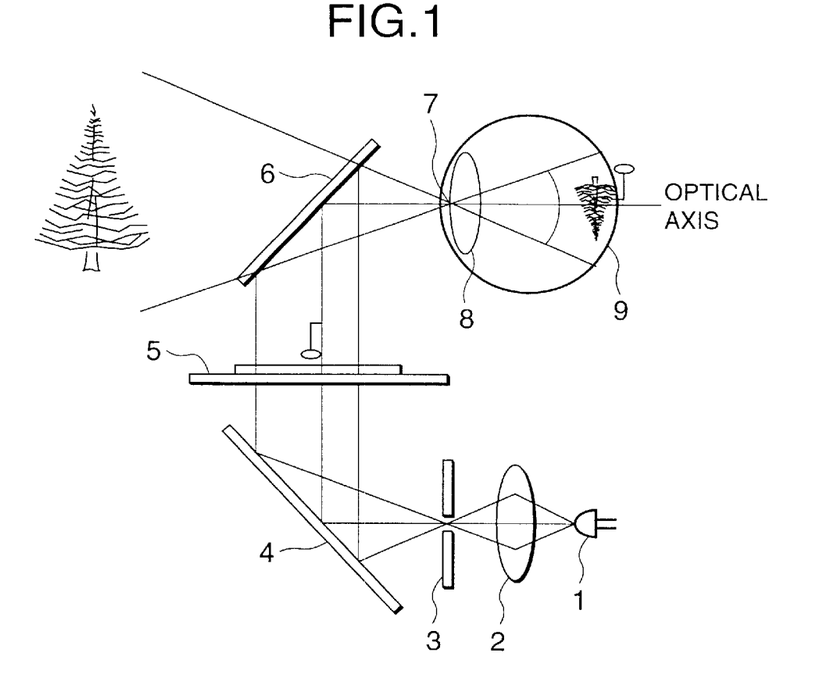
FIG. 1 is a view showing an image projection apparatus of embodiment 1 of the present invention.

FIG. 1 is a view showing an image projection apparatus of an embodiment of the present invention. In this embodiment, a hologram optical element is used for each of an illuminating optical system and an object optical system. As shown in the drawing, a beam of light from a light source 1 is converged through a condensing lens 2, and is brought to a focus at a space filter 3. This focus is a secondary point light source of a light source image, and functions as a new light source. A diverging spherical wave from the secondary light source is converted into parallel beams of light by an illuminating hologram optical element 4 functioning as an aspheric convex lens. The parallel beams of light illuminate a transmission space modulator (color liquid crystal display element) 5, are converted into converged beams of light by an object hologram optical element 6 functioning as another aspheric convex lens, and are brought into focus at a pupil 7. This point is a secondary light source image. This image becomes a Fourier transform image (diffraction image surface) of picture image information of the space modulator, and after passing through an eyeball lens 8, it forms a geometric image on a retina 9. According to this embodiment, an observer can recognize a picture image of a large screen in an angle of field corresponding to an aperture of the hologram optical element. Besides, even if a small movement occurs when the apparatus is mounted on a head, the retina image is not distorted, and the observer can recognize the picture image with high resolution while perceiving the outside.

Here, as the light source, it is conceivable to use a light source emitting a bright line spectrum or a light source having a narrow wavelength band width, such as a light emitting diode (LED) or a laser diode. As the condensing lens, it is conceivable to use a commercial objective lens for a microscope or a pickup, a ball lens, a refractive index distribution lens (selfoc lens), or the like. As the space filter, it is conceivable to use a pinhole. As the transmission space modulator, a commercial projector transmission liquid crystal display element is suitable in this case. Further, as a photosensitive material for the hologram optical element, it is possible to use silver salt emulsion, dichromated gelatin, photopolymer, chalcogenide glass, or the like. Here, photopolymer resistant against ultraviolet rays is preferable.

(Embodiment 2)

Figure 2:
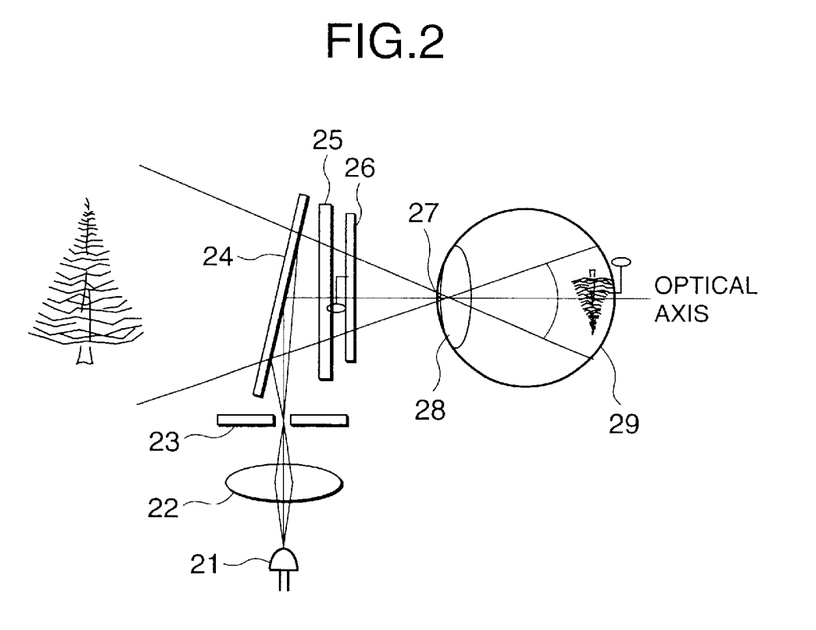
FIG. 2 is a view showing an image projection apparatus of embodiment 2 of the present invention.

FIG. 2 is a view showing an image projection apparatus of another embodiment of the present invention. In this embodiment, as an illuminating optical system, one hologram optical element is used. As shown in the drawing, beams of light from a light source 21 are converged through a condensing lens 22, and are brought to a focus at a space filter 23. This focus is a secondary point light source of a light source image, and functions as a new light source. A diverging spherical wave from this secondary light source is converted into converged beams of light by an illuminating hologram optical element 24 functioning as an aspheric convex lens. The beams of light diffracted by the illuminating hologram optical element 24 illuminate a transmission space modulator (display element) 25 disposed in its vicinity with the converged beams of light. Just after that, although an object hologram optical element 26 for controlling the converged beams of light is generally provided, this may be omitted as described later. A focus 28 is formed on a pupil 27 and a geometrical image is formed on a retina 29. According to this embodiment, the image display apparatus can be made small.

In the case of this embodiment, the transmittance of the liquid crystal display element with a polarizing plate determines a see-through property. The transmittance is as low as several % in the case of a color liquid crystal display element, and as high as 40 to 60% in the case of a monochromatic display. In this mode, the monochromatic display is preferable. Particularly, it becomes unnecessary to use the object hologram optical element 26 according to the way of phase modulation in the space modulator 25. By the omission of the optical element 26, the number of optical parts can be reduced, and can be made five in total. By this, the image projection apparatus can be constructed with the simple optical system.

(Embodiment 3)

Figure 3:
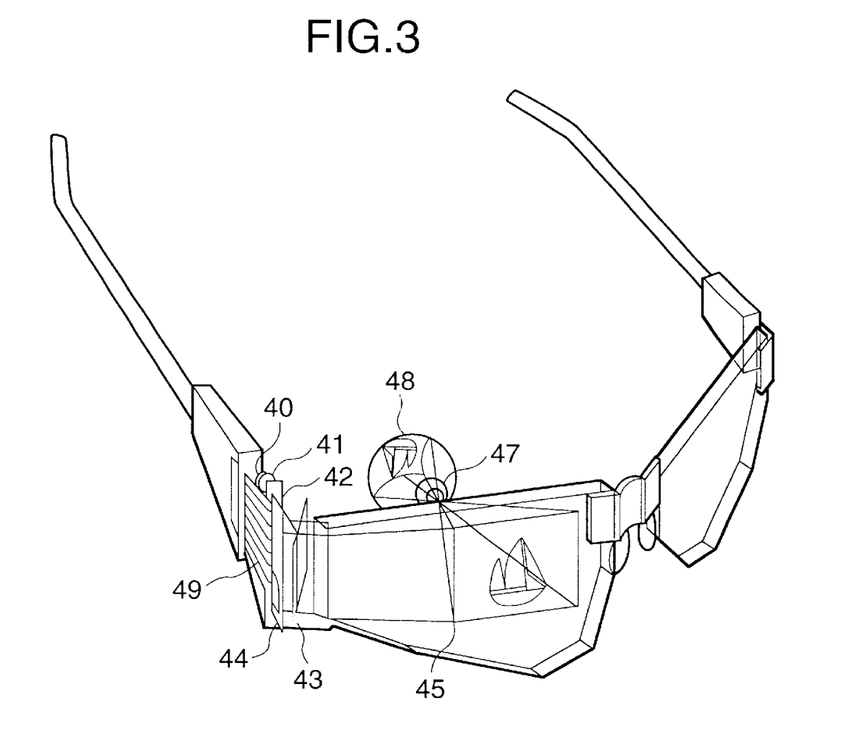
FIG. 3 is a view showing an image projection apparatus of embodiment 3 of the present invention.
Figure 4:
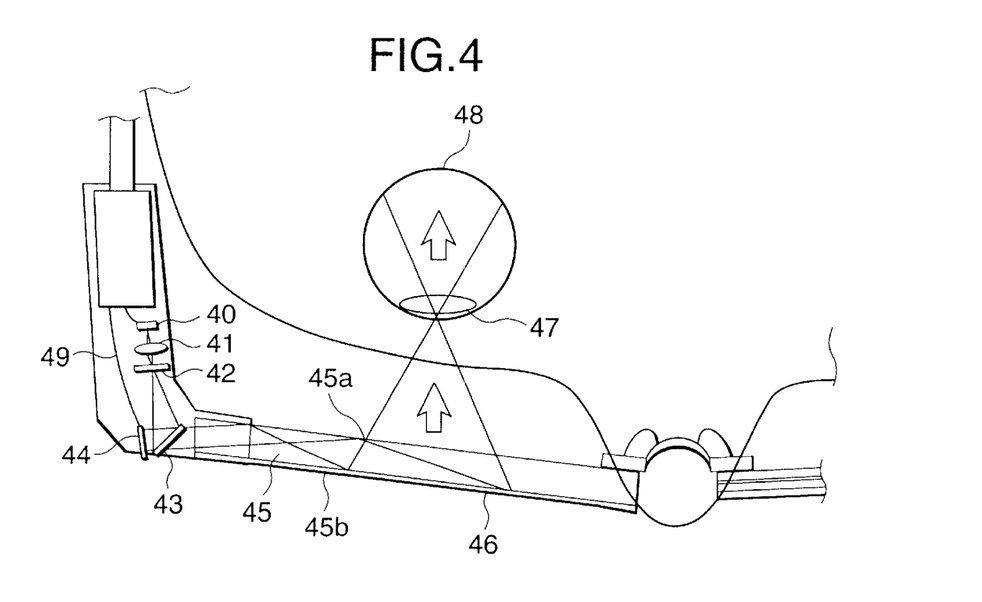
FIG. 4 is a view showing a partial sectional structure of the image projection apparatus of the embodiment 3.

FIG. 3 is a view showing an image projection apparatus of another embodiment of the invention. FIG. 4 is a view showing a partial sectional structure of the image projection apparatus of FIG. 3. In this embodiment, a hologram optical element is used for each of an illuminating optical system and an object optical system, and a color reflection LCD formed on Si-MOS is used as a display element. The structure has a shape similar to eyeglasses, in which picture image light is incident from an end surface of a transparent substrate.

In this embodiment, although a white LED is used as a minute light source 40, a midget lamp or the like may be used. Light from the minute light source 40 is brought into focus through a condensing lens 41 with a field stop. A pinhole 42 of 200 μm is put on the condensed point. This condensed point becomes a secondary point light source as described above. A diverging spherical wave from the secondary point light source is reflected by a color hologram optical element 43, becomes a parallel beam of light, and illuminates a reflection LCD 44 formed on Si-MOS. Instead of the color hologram optical element 43, a collimate lens may be used to make a parallel beam of light and a mirror may bend its light axis.

A color filter is attached to the surface of the reflection LCD 44, and a color image can be displayed. This reflection LCD is connected to a control portion provided on the frame of eyeglasses through a wiring line 49. The beam of light (diffracted beam of light of a color picture image) subjected to space modulation by the reflection LCD 44 passes (transmits) through the color hologram optical element 43, and then, the beam is incident from an end surface of a glass substrate 45 (or plastic substrate), is once reflected at a surface 45a of the substrate 45 to which a color hologram optical element 46 is not attached, and advances to an opposite surface 45b. Thereafter, the beam is incident on the color hologram optical element 46. Here, although the aperture of the hologram optical element 46 is made, for example, 1 inch (vertical: 15 mm, horizontal: 20 mm) at a diagonal, another size may be adopted. The beam of light diffracted and condensed by the color hologram optical element 46 is brought into focus at the center of an eyeball lens 47, and forms a geometrical image on a retina 48.

Figure 5A:
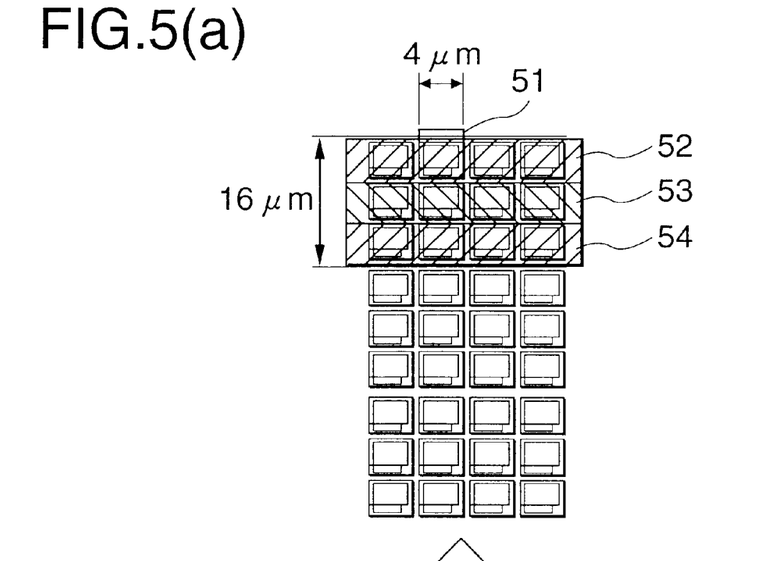
FIG. 5A is a structural view showing the specifics.
Figure 5B:
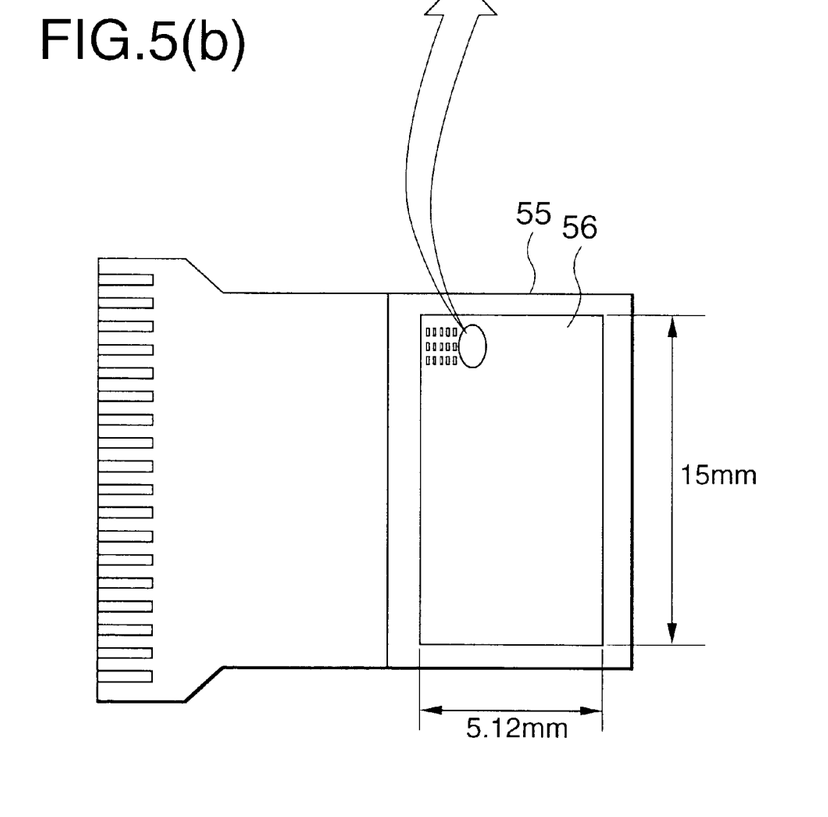
FIG. 5B is a structural view showing the entire.

FIGS. 5A and 5B are views showing a reflection LCD used in the embodiment 3, and FIG. 5A is a partial enlarged view of FIG. 5B. One color pixel 51 is constituted by pixels for three colors with a red filter 52, a green filter 53, and a blue filter 54. For the purpose of making display in SXGA, the size of one color pixel 51 is, as shown in FIG. 5A, 4 $\mu$m×16 $\mu$m, and the size of a screen 56 of the reflection LCD 55 is, as shown in FIG. 5B, 5.12 mm×15 mm. Alternatively, the reflection LCD 44 (for example, about 4 mm×3 mm) is subjected to extended illumination by the color hologram optical element 43, and a beam is converted into a converged beam of light by the hologram optical element.

(Embodiment 4)

Figure 6:
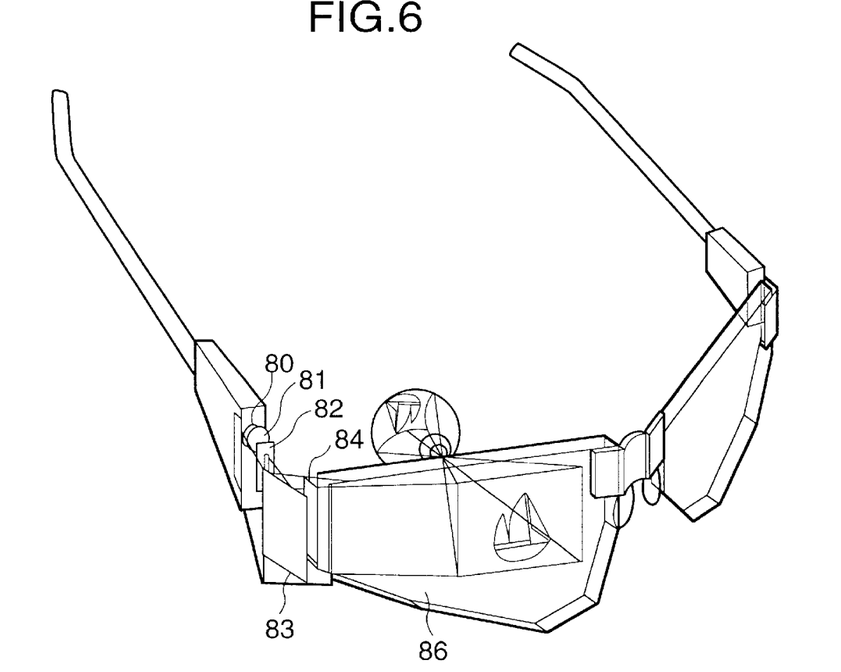
FIG. 6 is a view showing an image projection apparatus of embodiment 4 of the present invention.
Figure 7:
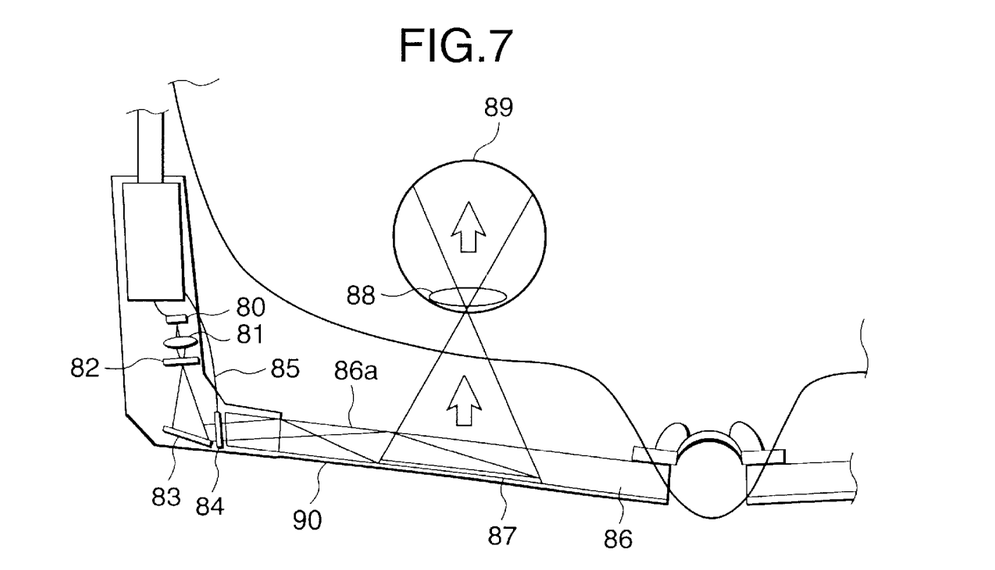
FIG. 7 is a view showing a partial sectional structure of the image projection apparatus of the embodiment 4.

FIG. 6 is a view showing an image projection apparatus of another embodiment of the invention. FIG. 7 is a view showing a partial sectional structure of the image projection apparatus of FIG. 6. In this embodiment, a hologram optical element is used for each of an illuminating optical system and an object optical system, and a color transmission LCD is used as a display element. The structure has a shape similar to eyeglasses, in which a picture image beam of light is incident from an end surface of a transparent substrate.

In this embodiment, a beam of light emitted from an LED 80 passes through a condensing lens such as an objective lens 81 with a field stop, and forms a secondary point light source on a pinhole 82. The beam of light from this secondary point light source becomes a rectangular illuminating beam of light with a different aspect ratio by the action of a hologram optical element 83, and illuminates a transmission LCD 84. An electric signal is sent to the transmission LCD 84 through a wiring line 85 from a driver circuit incorporated in an eyeglasses type frame. A picture image beam subjected to space modulation and having different aspect ratio is incident from an end surface of a glass substrate 86, and after the beam is once reflected at a surface 86a of the substrate 86 to which a hologram optical element 87 is not attached, it is diffracted and condensed by the hologram optical element 87.

Although the aperture of the hologram optical element is, for example, 1 inch (vertical: 15 mm, horizontal: 20 mm) at a diagonal, another size may be adopted. The beam of light diffracted and condensed by the hologram optical element 87 is brought into focus at the center of an eyeball lens 88, and forms a geometric image on a retina 89. The surface of the hologram optical element 87 on which the glass substrate 86 is provided is coated with a protective film 90 for protecting the hologram element. As the substrate 86, a plastic substrate may also be used other than the glass substrate.

(Embodiment 5)

Figure 8:
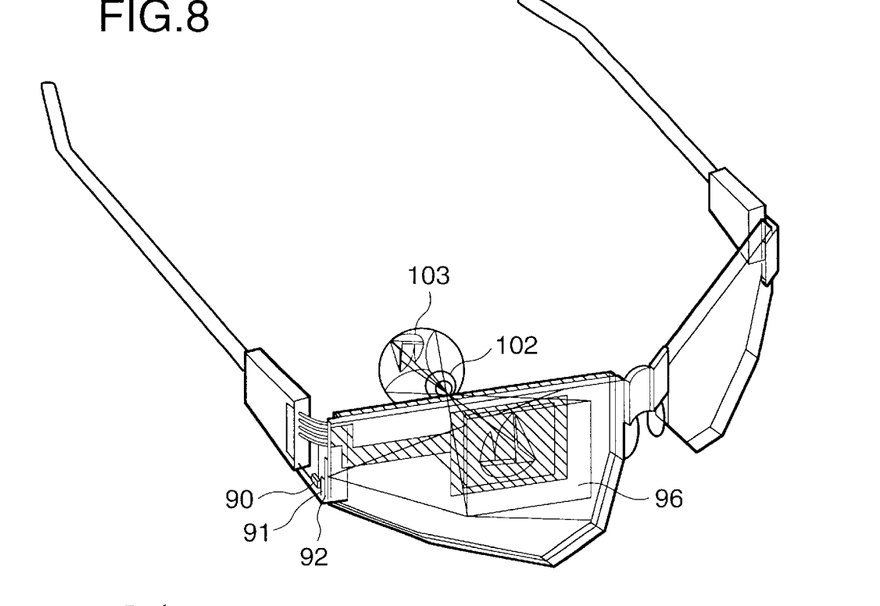
FIG. 8 is a view showing an image projection apparatus of embodiment 5 of the present invention.
Figures 9A, 9B:
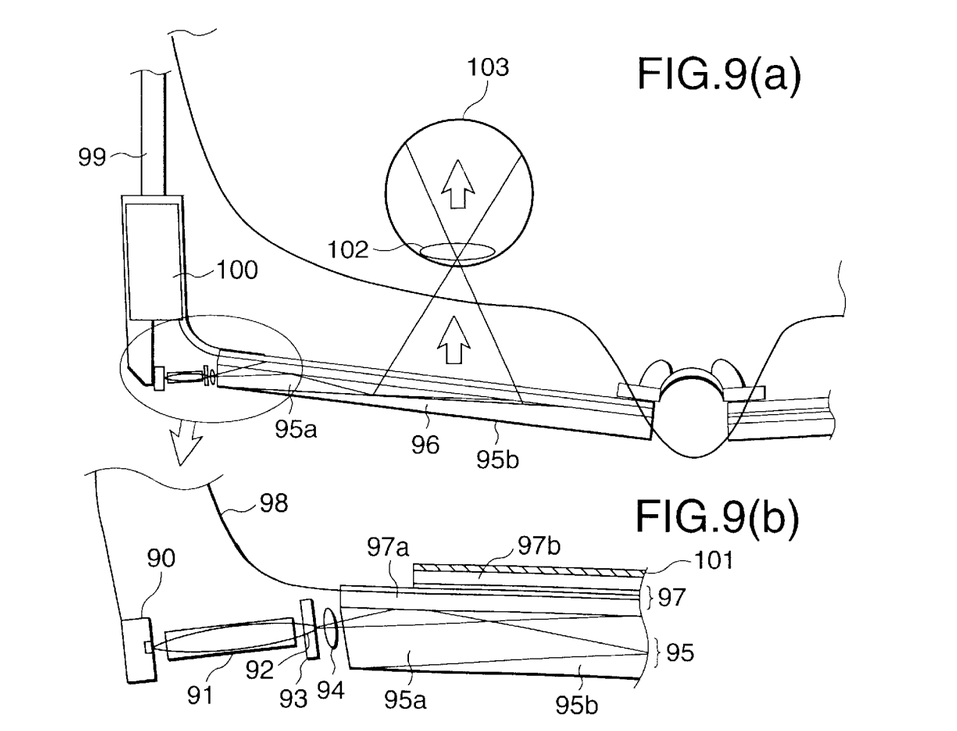
FIGS. 9A and 9B are views showing a partial sectional structure of the image projection apparatus of the embodiment 5.

FIG. 8 is a view showing an image projection apparatus of another embodiment of the invention. FIGS. 9A and 9B are views showing a partial sectional structure of the image projection apparatus of FIG. 8. In this embodiment, one hologram optical element is used, and a color transmission LCD is used as a display element. The structure has a shape similar to eyeglasses, in which an illuminating beam of light is incident from an end surface of a transparent substrate.

In this embodiment, a beam of light from an LED 90 is condensed by a distributed index lens 91, and a polarizing plate 92 with a pinhole 93 is put on the condensed point. Here, the pinhole 93 and the polarizing plate 92 maybe separately prepared and be made to be in close contact with each other. Alternatively, aluminum or chromium is evaporated on the polarizing plate, and then, a pinhole may be formed by an etching step. Alternatively, these can also be formed with an integrated unit. A spherical diverging wave from the pinhole 93 is incident from an end surface of a plastic substrate 95 made of two prisms with a thickness of 5 mm into the substrate. Here, in order to control an expanding angle from the pinhole, a lens 94 may be provided. Thereafter, after the beam is once reflected at the surface of the prism 95a on which a hologram optical element 96 is not provided, it is reflected and diffracted at the hologram optical element 96, and is incident on a transmission LCD 97.

Here, in order to perceive the outside, a prism 95b with the same shape is provided to be in close contact. The aperture of the hologram optical element is about 1.1 inches at a diagonal. The transmission LCD 97 being in close contact with the hologram optical element includes a substrate and a TFT array formed thereon, and its size is about 20 mm×15 mm. A TFT array substrate 97a constituting the transmission LCD 97 is disposed at the hologram optical element side. A color filter substrate 97b exists at an eye side. The TFT array indicated by oblique lines in FIG. 8 and a transparent wiring line connected thereto are connected to a driver circuit 100 incorporated in a frame 99 of eyeglasses through an outer wiring line 98. This driver circuit 100 may be incorporated in an outer frame of an eyeglass.

The converged illuminating beam of light diffracted by the hologram optical element 96 receives space modulation at the transmission LCD 97, and passes through a polarizing plate 101 disposed immediately after that. Here, the polarizing plate 101 is disposed to be orthogonal to a polarized beam emerging from the polarizing plate disposed near the light source. The beam of light having passed through the polarizing plate 101 is brought into focus at the center of an eyeball lens 102 positioned at the focus of the hologram optical element 96, and forms a geometric image on a retina 103.

In the transmission LCD 97 used here, it is necessary that a display area is 20 mm in horizontal×15 mm in vertical, and one color pixel is 16 $\mu$m square. However, in the case where the resolution is a VGA level, a pixel becomes 32 $\mu$m square. In the case of color display, since a color filter exists just before the eyeball, the see-through property is very low. However, when a monochromatic liquid crystal display element is used as the display element, and a unicolor LED is used as the light source, the transmittance becomes about 40 to 60%, and it is possible to secure sufficiently the see-through property so that a user can walk outside while mounting the image projection apparatus of the invention.

When the present invention is compared with the related art, in the related art, it is necessary to use two illuminating lenses, two objective lenses, and two mirrors, in addition to a light source and a space modulator, that is, eight optical parts in total at the minimum. In the present invention, even if a condensing optical system is newly added in order to realize coherent illumination, the number of optical parts including condensing means constituted by a hologram optical element or lens, a space filter, and a hologram optical element of an illuminating optical system is five in total at the minimum. Even if a hologram optical element of an object optical system is added to this, the image projection apparatus can be obtained with the six parts in total.

As described above, according to the image projection apparatus of the invention, a beam of light from a minute light source forms a secondary minute point light source of a light source image, a display element is illuminated with a clear spherical wave (coherent light) generated from there or a beam through an illuminating optical system, at the minimum, 0th-order and ±1st -order diffraction beams of light are condensed by an object optical system of a hologram optical element, a secondary point light source is formed on a pupil (eyeball lens surface), and a picture image of the display element is projected on a retina.

As a result, the number of optical parts such as a lens can be greatly lowered as compared with the related art while high resolution and a wide angle of view are maintained. Besides, since the apparatus is simplified and can be made small and thin, it is suitable for a head mount type image projection apparatus, and long time use also becomes possible. Further, since distortion does not occur even if the eyeball moves, it becomes possible to observe a stable screen in a mounted state, and the apparatus is excellent in a mounting property.

As described above, according to the present invention, it is possible to obtain an image projection apparatus which is small and in which an image can be stably observed while high resolution is maintained. Besides, the see-through property can also be secured.

What is claimed is:

1. An image projection apparatus comprising:
   a light source;
   a space filter receiving a beam of light from said light source to function as a secondary light source; and
   a space modulator illuminated with a beam of light from said secondary light source,
   wherein an image of said secondary light source is formed on a pupil and a picture image of said space modulator is projected on a retina,
   an illuminating optical system between said space filter and said space modulator comprising a hologram optical element.

2. An image projection apparatus according to claim 1, further comprising an object optical system at a beam outgoing side of said space modulator.

3. An image projection apparatus according to claim 2, wherein said object optical system includes a hologram optical element.

4. An image projection apparatus according to claim 1, wherein said hologram optical element is of a large-off axis type.

5. An image projection apparatus according to claim 1, wherein said aspheric hologram optical element includes a transparent material.

6. An image projection apparatus according to claim 1, wherein said space filter includes an opening with a diameter of 2 mm or less.

7. An image projection apparatus according to claim 1, wherein said light source is constituted by one selected from the group consisting of a midget lamp, a light emitting diode, and a laser diode.

8. An image projection apparatus according to claim 1, further comprising a condensing optical system between said light source and said space filter.

9. An image projection apparatus according to claim 8, wherein said condensing optical system is constituted by at least one of a single lens, a hologram optical element, and a diffraction optical element.

10. An image projection apparatus according to claim 1, wherein the holographic optical element functions as an aspheric convex lens.

11. An image projection apparatus comprising:
    a light source disposed at a side of an eyeglasses frame;
    a space filter receiving a beam of light from said light source to function as a secondary light source;
    a space modulator illuminated with a beam of light from said secondary light source;
    a transparent substrate attached to said eyeglasses frame; and
    a hologram optical element disposed at said transparent substrate and adjusted such that an image of said secondary light source is formed on a pupil and a picture image of said space modulator is projected on a retina.

12. An image projection apparatus according to claim 11, wherein said transparent substrate has a flat surface.

13. An image projection apparatus according to claim 11, wherein said hologram optical element is formed by use of one selected from the group consisting of silver salt film, dichromated gelatin, and photopolymer.

14. An image projection apparatus according to claim 11, wherein said hologram optical element is covered with a protective film.

15. An image projection apparatus according to claim 11, wherein said transparent substrate has a curved surface shape.

16. An image projection apparatus according to claim 11, wherein the holographic optical element functions as an aspheric convex lens.

17. An image projection apparatus comprising:
    a light source; and
    a space modulator illuminated with a beam of light from said light source;
    wherein a diameter of a 0th-order diffraction beam of light and a first-order diffraction beam of light of a diffraction image surface formed on a pupil by a beam of light from said space modulator is made 2 mm or less, and a picture image of said space modulator is projected on a retina.

18. An image projection apparatus according to claim 17, wherein said light source is a secondary light source formed of a space filter.

19. An image projection apparatus according to claim 18, wherein said space filter is constituted by at least one of an aperture stop and a field stop or a pinhole.

20. An image projection apparatus comprising:
    a light source in which a diameter of an outgoing beam is 2 mm or less; and
    a space modulator illuminated with a beam of light from said light source,
    wherein an image of said light source is formed on a pupil, and a picture image of said space modulator is projected on a retina.

21. An image projection apparatus according to claim 20, further comprising an object optical system disposed at a beam outgoing side of said space modulator and adjusted such that an image of said light source is formed on a pupil.

22. An image projection apparatus comprising:
    a light source;
    a space filter including a light passing hole with a diameter smaller than a diameter of a beam of light incident from said light source; and a space modulator illuminated with a beam of light having passed through said space filter;

wherein a condensed point of a beam of light from said space modulator is positioned on a pupil and a picture image of said space modulator is projected on a retina.

23. An image projection apparatus according to claim 22, wherein a diameter of said light passing hole of said space filter is 2 mm or less.

24. An image projecting method, comprising the steps of:

causing a beam of light from a light source to pass through an opening of diameter of 2 mm or less;

illuminating a space modulator by said minute opening as a secondary light source;

forming an image of said secondary light source on a pupil; and projecting a picture image of said space modulator on a retina.

25. An image projecting method according to claim 24, wherein a beam of light from said secondary light source is diffracted by a hologram optical element and the image of said secondary light source is formed on said pupil.

26. An image projecting method, comprising the steps of:

causing a beam of light from a light source to pass through a minute opening;

illuminating a space modulator by said minute opening as a secondary light source;

diffracting a beam of light from said secondary light source by a hologram optical element;

forming an image of said secondary light source on a pupil; and projecting a picture image of said space modulator on retina.

* * * * *